July 5, 1955  J. LOVE  2,712,454
SELF-SEALING COUPLINGS
Filed March 19, 1952  5 Sheets-Sheet 1

Inventor
JOHN LOVE
By Lucke & Lucke
Attorney

July 5, 1955  J. LOVE  2,712,454
SELF-SEALING COUPLINGS
Filed March 19, 1952  5 Sheets-Sheet 3

Inventor
JOHN LOVE
By Lucke & Lucke
Attorney

July 5, 1955   J. LOVE   2,712,454
SELF-SEALING COUPLINGS
Filed March 19, 1952   5 Sheets-Sheet 4
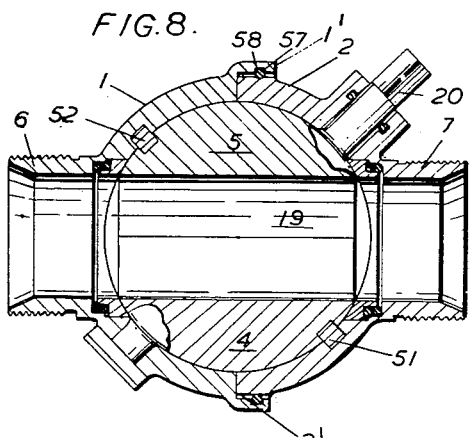
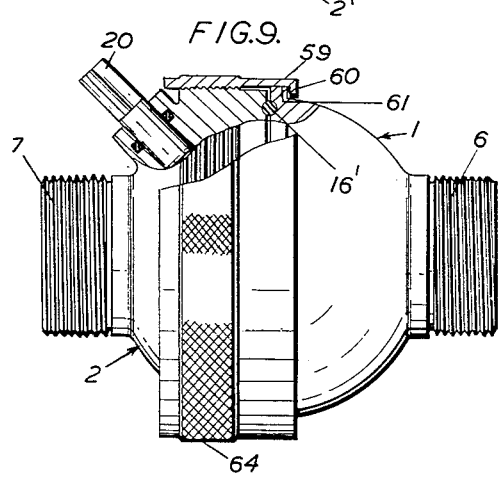
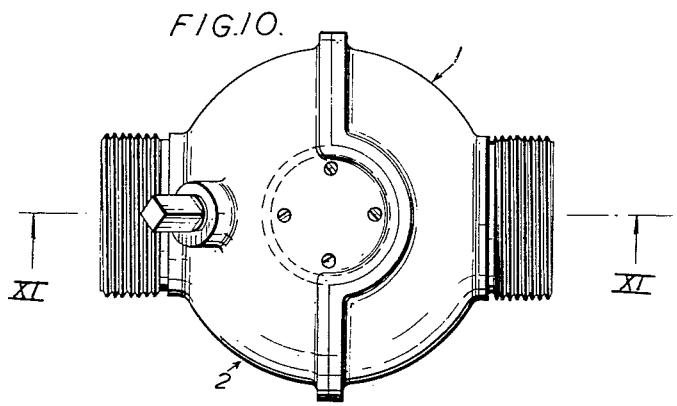
Inventor
JOHN LOVE
Attorney

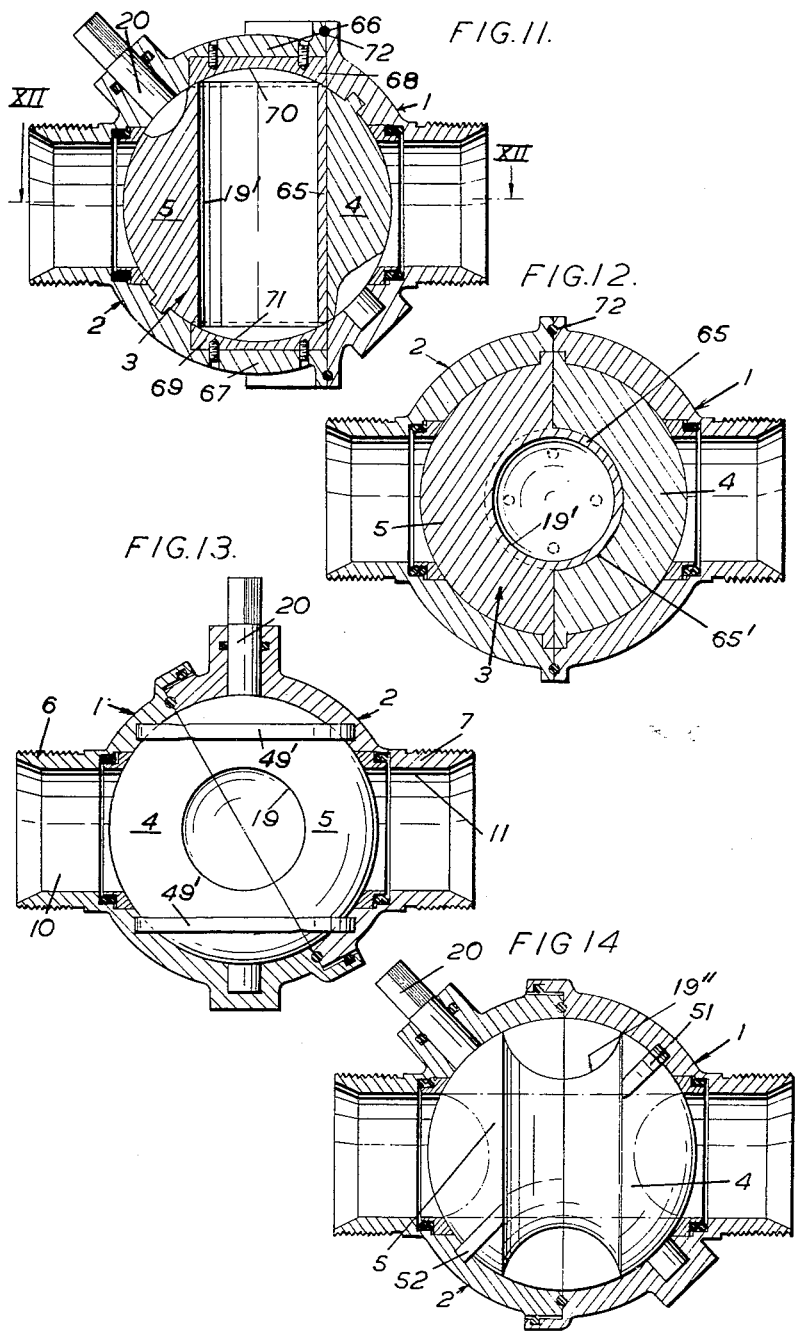

United States Patent Office 2,712,454
Patented July 5, 1955

2,712,454

SELF-SEALING COUPLINGS

John Love, Langside, Glasgow, Scotland, assignor to K. A. C. Limited, Glasgow, Scotland, a British company Application March 19, 1952, Serial No. 277,439

Claims priority, application Great Britain March 20, 1951

16 Claims. (Cl. 284—4)

This invention concerns improvements in or relating to self-sealing couplings for use with pipes or hoses and fittings employed for conveying fluids, especially liquids, under pressure.

Self-sealing couplings of the kind with which the present invention is concerned comprise two parts for application respectively to the pipes, hoses or fittings (e. g. a tubular spigot or the like) which are to be connected together and in which each of said coupling parts includes a valve member for sealing the pipe, hose or fitting to which the coupling part is attached whenever this pipe, hose, or fitting is disconnected from its cooperating pipe, hose or fitting.

For the sake of brevity the said pipes, hoses, and fittings will hereinafter all be referred to inclusively as "pipes."

Self-sealing couplings are frequently employed in the hydraulic systems used in aircraft, on vehicles, and industrially where it is important that pipe lines should be capable of disconnection at the couplings without appreciable loss of fluid pressure. For this purpose a variety of forms of self-sealing coupling have been previously proposed in which the coupling comprises two parts adapted to be secured together in coaxial alignment and in which the two parts of the coupling have each been provided with a valve adapted automatically to close on the separation of the two coupling parts, thereby to prevent the loss of fluid.

An object of the present invention is to provide an improved form of self-sealing coupling of the kind referred to.

According to this invention there is provided a self-sealing pipe coupling comprising: two tubular coupling parts each having a bore terminating in a part-spherical recess and together defining a hollow spherical valve chamber; a composite spherical valve, having a passage therein, rotatable in said valve chamber and comprising two separable complementary part-spherical valve segments; a radial spindle on one of said valve segments for rotating said composite valve between a valve-open position, in which said passage registers with said coupling-part bores, and a valve-closed position in which each such bore is sealed by one of said valve segments, said spindle being journalled in one of said coupling parts and extending to the exterior thereof, the axis of said spindle lying in a plane, oblique to the junction between said valve segments, constituting one of three orthogonal planes, the centre line of said passage lying in the second of such planes when the valve is in said valve-open position and in the third of such planes when the valve is in said valve-closed position; co-operating means on said coupling parts and valve segments for retaining a valve segment in each coupling part recess when the valve is in said valve-closed position; and means for securing said coupling parts together when said valve is in said valve-open position.

The axis of rotation of the said composite spherical valve is preferably arranged so as to be oblique to the axis of the bores of the said coupling parts. This arrangement has a number of advantages including increased compactness of the coupling and the freedom to arrange for the junction between the two coupling parts to be through a diametrical plane of the valve at right angles to the axis of the bores of the two coupling parts when these are coaxially aligned in the connected coupling.

The said passage may, and preferably is, formed through the valve so that at least the end portions of its centre line lie upon a diameter of the valve and preferably the passage will be rectilinear. Thus in a preferred arrangement of this kind, the axis of rotation of the valve will be oblique to the axes of the bores of the said two coupling parts and will bisect the angle between the positions of at least the end portions of the axis of the said passage when the valve is respectively in its valve-open position and in its valve-closed position.

Nevertheless the said passage may comprise one or more grooves around the exterior of the valve, said groove or grooves being at, or adjacent to, the equator of the valve and having its or their centre line or lines, in a plane coincident with, or parallel to, the plane containing said equator.

In order that the invention may be more readily understood certain embodiments of the same will now be described with reference to the accompanying drawings in which:

Fig. 7 is a sectional view similar to Fig. 2 but showing a modification of the coupling illustrated in Figs. 1 to 6;

Fig. 8 is another view similar to Fig. 2 illustrating a still further modification of the coupling shown in Figs. 1 to 6;

Fig. 9 is a part sectional side elevation of another modification of the coupling illustrated in Figs. 1 to 6;

Figs. 10, 11 and 12 are respectively a plan, a section on line XI—XI, Fig. 10, and a section on line XII—XII, Fig. 11, all illustrating a still further modification of the coupling shown in Figs. 1 to 6;

Fig. 13 illustrates in a vertical section a still further form of self-sealing coupling constructed in accordance with this invention; and Figs. 14 and 15 are further views similar to Fig. 2 respectively illustrating two other modifications of the valve shown in Figs. 1 to 6.

Figure 1:
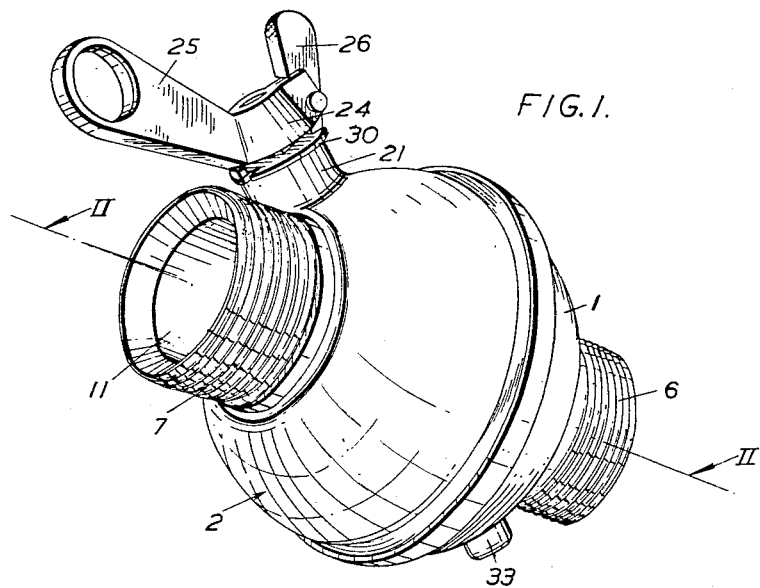
Fig. 1 is a perspective view of one form of self-sealing pipe coupling constructed in accordance with this invention.
Figure 2:
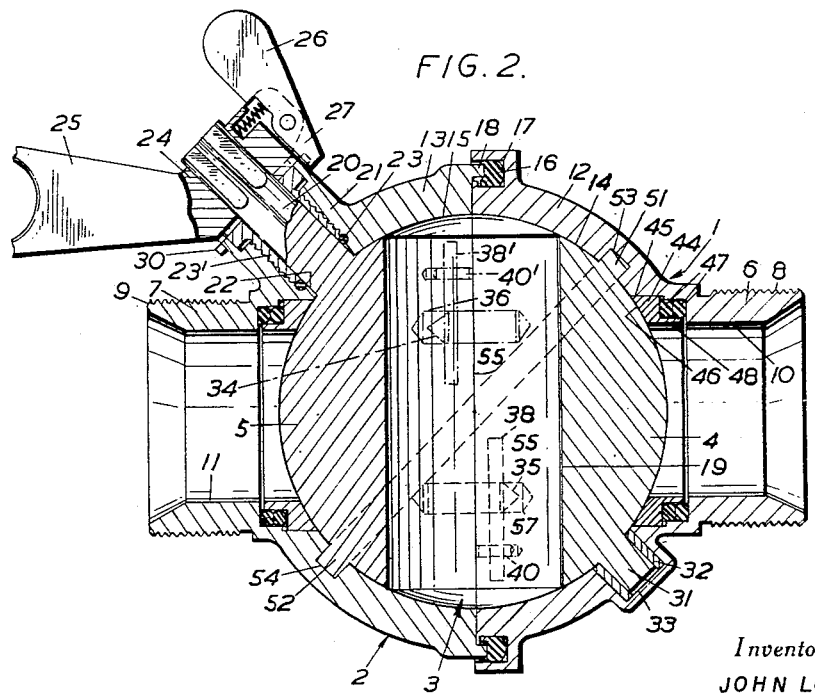
Fig. 2 is a section on line II—II, Fig. 1, showing the valve of the coupling in its coupling part-sealing position.

Referring to Figs. 1 to 6 of the drawings, it will be seen that the self-sealing coupling there illustrated comprises two complementary separable coupling parts respectively marked 1 and 2 and a spherical valve 3 consisting of two complementary separable hemi-spherical segments 4 and 5. The two coupling parts 1 and 2 are respectively provided with tubular spigots 6 and 7 which are externally screw threaded at 8 and 9 respectively to receive the union nuts of the pipes to which the coupling is to be connected. The spigots 6 and 7 have internal bores, respectively marked 10 and 11, which are of the same diameter and which when the two coupling parts are brought together as shown in Fig. 2, are coaxial.

The front end portions of the coupling parts 1 and 2 are in the form of cups 12 and 13 respectively provided with internal hemi-spherical seats 14 and 15 in which are respectively seated the two segments 4 and 5 of the valve 3. These segments are of such dimensions that the spherical composite valve 3 formed thereby fills, but is freely rotatable in, the spherical chamber defined by the two hemi-spherical seats 14 and 15 when the two coupling parts 1 and 2 are brought together.

Peripheral sealing means are provided between the front or meeting faces of the two coupling parts 1 and 2, such sealing means conveniently comprising a resilient O-ring 16 located in an annular recess 17 in the front face of the coupling part 1 and adapted, when the two coupling parts are brought together, to be engaged and compressed in this annular recess by an annular rib 18 on the front face of the coupling part 2.

Figure 3:
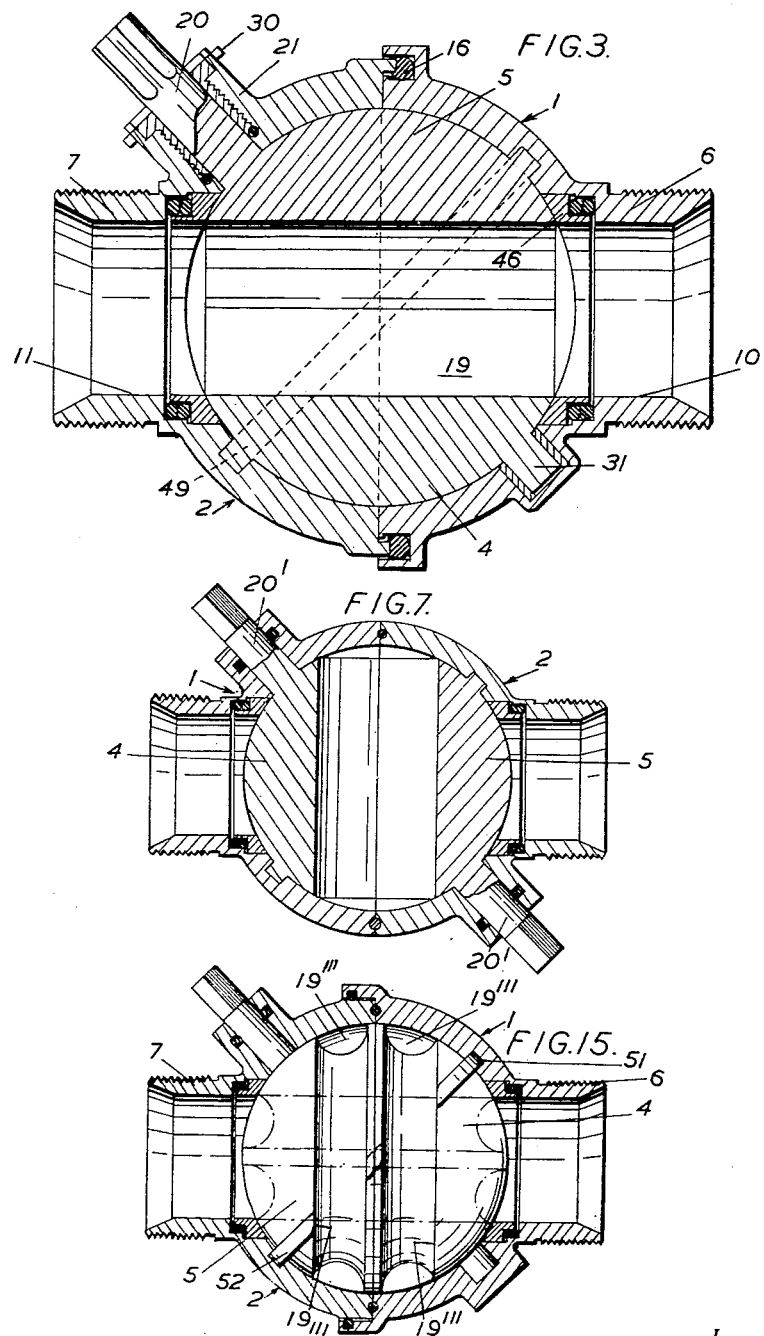
Fig. 3 is a view similar to Fig. 2 but showing the valve in its open position in which it places the bores of the two coupling parts in communication with one another.

The valve 3 is furnished with a diametrical cylindrical passage 19 which extends completely therethrough, this passage being formed half in the plane front face of the valve segment 4 and half in the plane front face of the valve segment 5 as clearly shown in the drawings. This passage 19 is of the same diameter as the bores 10 and 11 of the coupling parts 1 and 2 and is intended to occupy selectively one or the other of two alternative positions, namely one in which the passage (as shown in Fig. 3) is in alignment, and coaxial, with the bores 10 and 11 of the coupling parts 1 and 2 so as to place these bores in communication with one another, and another in which the axis of the passage is, as shown in Fig. 2, at right angles to the axes of the bores 10 and 11 of the coupling parts 1 and 2. When the valve 3 has been moved to bring the passage 19 into the latter of the said two alternative positions, the front or meeting faces of the valve segments 4 and 5 are at right angles to the axes of the bores 10 and 11 and also in the same plane as the meeting faces of the two coupling parts 1 and 2, all as clearly shown in Fig. 2. Moreover, in these positions the valve segments 4 and 5 respectively seal the front ends of the bores 10 and 11.

It will thus be noted that the centre line of the passage 19 of the composite valve 3 is located, when in either of its said two alternative positions, in one or the other of two planes intersecting at right angles whilst the axis of rotation of the valve bisects the angle between said intersecting planes and lies in a third orthogonal plane.

The valve 3 is rotatable in the spherical chamber formed by the hemi-spherical seats 14 and 15 about an axis which is oblique to the axes of the bores 10 and 11 of the coupling parts 1 and 2 and which bisects the angle formed between the axis of the passage 19 when the latter occupies respectively the two alternative positions shown in Figs. 2 and 3 of the drawings.

Thus, in the example illustrated in Figs. 1 to 6 of the drawings where the axes of the bores 10 and 11 of the two coupling parts 1 and 2 are coaxial and the passage 19 through the spherical valve is cylindrical and has its axis passing through the centre of the valve 3, the axis of rotation of this valve is located at 45° to the axes of the said bores 10 and 11 of the coupling parts 1 and 2.

The valve 3 is provided with an operating spindle 20 projecting outwardly therefrom at an angle of 45° to the front or meeting face of the segment 5 of the valve on which the spindle is formed or fixed, the spindle being radial to the valve 3 and having its axis lying in a plane containing the axis of the bores 10 and 11 of the coupling parts 1 and 2.

The spindle 20 passes through a tubular boss 21 on the coupling part 2 and is fluid-tightly sealed in the bore 22 of this boss by means of an O-ring or other suitable packing 23, this sealing ring or packing being compressed around the spindle 20 by means of a gland sleeve 23' screwed into the boss 21.

The spindle 20 projects outwardly beyond the outer end of the boss 21 and the gland sleeve 23' and is squared at its outer end to receive the boss 24 of an operating lever 25 which is fixed upon the spindle 20 so that the latter rotates with the lever.

The boss 24 of the lever 25 is provided with a spring-urged catch 26, the nose 27 of which is adapted to engage in one or the other of two notches, respectively marked 28 and 29, provided in peripheral flange 30 on the tubular boss 21. The said notches are angularly spaced by 180°, this being the angle through which the valve 3 has to be rotated to move the passage 19 from one to the other of its said two alternative positions and the catch 26 serving releasably to lock the valve in these two alternative positions. Thus by first disengaging the nose of the catch 26 from the notch 28 or 29 in which it is engaged and then rotating the spindle 20, the valve can be rotated until the nose 27 of the said catch automatically engages in the other of the said two notches when the rotation of the valve will be arrested.

The segment 4 of the valve 3 is provided with a stub spindle 31 which is, when the two valve segments 4 and 5 are in engagement with one another as shown in Fig. 2, coaxial with the spindle 20, the stub spindle 31 seating in a bearing 32 housed in a sealed recess 33 in the coupling part 1.

Means are provided for inter-engaging the two segments 4 and 5 of the spherical valve 3 when these segments are brought together, whereby the segments will rotate unitarily and be held against separation by force exerted in the direction of the planes of their meeting faces. Such inter-engaging means may comprise, as shown in the embodiment of the invention illustrated, a pair of pins 34 and 35, these pins being respectively carried eccentrically by the two valve segments 4 and 5 in a diametrical plane of the valve 3 and each pin being adapted to engage in a corresponding hole or recess 36 or 37 formed in the opposite valve segment, the said pins 34 and 35 projecting forwardly from the front or meeting faces of their valve segments at right angles to these faces and the holes or recesses 36 or 37 being similarly disposed in their segments.

To facilitate the entry of the pins 34 and 35 into their respective holes 36 and 37 the outer ends of the pins are tapered or pointed as shown and/or the outer ends of the holes 36 and 37 may be flared. Thus when the two segments 4 and 5 of the valve 3 are brought together to form the composite valve, the pins 34 and 35 enter the holes 36 and 37 and the two valve segments are interengaged so as to rotate unitarily about the axis of the spindle 20. Moreover when the valve has moved from the position shown in Fig. 2 towards the position shown in Fig. 3 and finally to the latter position, the axes of the pins 34 and 35 will be obliquely transversely disposed with respect to the meeting faces of the coupling parts 1 and 2 and will tend to resist the separation of the two segments and, because of the interengagement of the segments 4 and 5 with the coupling parts 1 and 2 as hereinafter described, the axial separation of these coupling parts.

In order to retain or lock the segments 4 and 5 against accidental rotation from the positions shown in Fig. 2 after separation of the coupling parts 1 and 2, retaining or locking catches are provided for these segments. In the example illustrated there is one retaining catch provided for each valve segment, such catches being respectively marked 38 and 38'. Each of these catches is located in a narrow recess 39 formed in the hemispherical surface of its respective valve segment adjacent, and parallel to the front or meeting face of such segment, the arrangement of the catch being clearly shown in Figs. 2 and 4. Each catch 38, 38' is pivoted at one end upon a pivot pin 40, 40' fixed in the corresponding valve segment at right angles to the front face thereof so that the catch 38 or 38' is free to swing in a plane parallel to the front or meeting face of the valve segment, each catch being urged by a spring 41 outwardly towards the hemispherical seating of the respective coupling part, this seating being provided with a narrow segmental recess 42 milled or otherwise formed in the appropriate coupling part as clearly shown in Figs. 4 and 5. Each such recess is located in such a position that the corresponding catch, i. e. the catch 38 in the case illustrated in Fig. 4, can swing outwardly and engage in this recess so as to preclude further rotation of the valve segment carrying the catch. As the catch 38 and recesses 39 and 42 in the valve segment shown in Fig. 4 and the corresponding catch and recesses in the complementary valve segment and coupling part are arranged in planes which are oblique to the axis of rotation of the valve segments 4 and 5, it will be understood that, when the catches 38 and 38' engage in the recesses 42, the valve segments are locked against rotation in their respective coupling parts.

Figure 4:
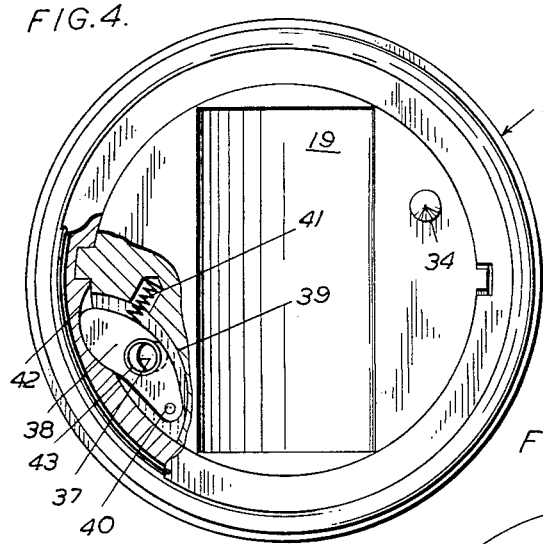
Fig. 4 is a part sectional front end view of the right hand half of the coupling shown in Fig. 2.
Figure 6:
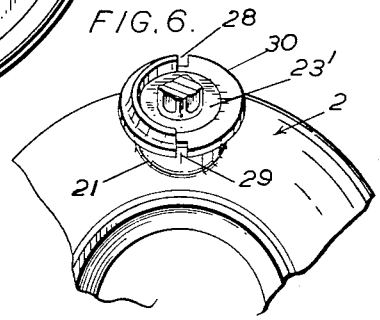
Fig. 6 is a fragmentary end elevation of the coupling shown in Figs. 1 to 5, looking from the left of Fig. 1.

The catches 38 and 38' are arranged more or less on the diameters of the valve segments 4 and 5 on which lie the pins 34 and 35 previously referred to, the catches being at opposite ends of these diameters; each of the catches is provided with a hole, shown clearly in Fig. 4 and marked 43, which is capable of registration with the adjacent hole or recess 36 or 37 intended to receive the pins 34 and 35, said hole 43 being somewhat offset with respect to the hole 36 or 37 when the catch is in its locking position but all these holes being brought into register when the two valve segments 4 and 5 are placed together, this registration being effected by the action of the inclined surfaces of the tapered or pointed ends of the pins 34 and 35 which pass into the holes 36 and 37 of the valve segments, and in so doing, enter the corresponding holes 43 in the catches 38 and 38', thus moving these catches, against the action of their springs 41, from their locking positions into their release positions in which they are entirely housed in their respective recesses 39.

Thus when the valve 3 has been turned to the position shown in Fig. 2 and the two parts 1 and 2 of the coupling have been separated, the catches 38, 38' automatically spring into locking position to prevent the rotation of the segments 4 and 5 in their respective coupling parts 1 and 2 but, on re-connecting the two coupling parts 1 and 2, the pins 34 and 35 automatically move the catches 38 to their release positions and free the valve 3 for rotation in the connected coupling parts.

Sealing means are provided at the bases of the hemispherical recesses of the coupling parts 1 and 2 around the front ends of the bores 10 or 11 of the latter for effecting a fluid-tight seal at this position between the coupling part and the corresponding valve segment 4 or 5. Such sealing means comprise in each case a sealing ring 44 conveniently formed of relatively hard or rigid or substantially rigid material such as for example, metal or an oil-resistant moulded rubber, and located in an enlargement 45 of the bore 10, or 11, of the coupling, the sealing ring having a spherical front surface 46 to match the hemispherical surface of the adjacent valve segment 4 or 5.

The sealing ring 44 is urged forwardly or pressed against the adjacent valve segment by resilient means such as a spring or one or more, e. g. a pair of resilient packing rings 47 which may conveniently be O-rings also preferably formed of an oil-resistant rubber or similar material. These resilient packing rings also form a seal to prevent leakage of fluid around the outside of the sealing ring 44 which is a close but sliding fit in the bore enlargement 45. Moreover, each sealing ring 44 is preferably provided at its inner part with a rearwardly directed skirt 48 which projects coaxially into the packing rings 47.

Packing rings such as the rings 44 having spherical seating surfaces 46 are relatively easy to produce and make very efficient seals with the hemi-spherical valve segments 4 and 5 so that the likelihood of fluid escaping around the periphery of the valve 3 is substantially precluded. Sealing rings of this form are much easier to construct than sealing elements for use with rotatable valve plugs of cylindrical or conical form, and produce a more efficient seal than the latter.

The composite spherical valve 3 and the coupling parts 1 and 2 have inter-engaging or guide means whereby the two coupling parts are automatically secured together, or whereby the securing together of these parts is assisted, when the valve 3 is moved from the position shown in Fig. 2 to the position shown in Fig. 3. Although the said inter-engaging or guide means may comprise a pin and groove arrangement they conveniently comprise, as shown in the embodiment of the invention illustrated in Figs. 1 to 6, a key and a keyway with which the valve 3 and the coupling parts 1 and 2 are respectively provided. It is possible to have the keyway in the valve and the key on the coupling parts but it is preferred to use the arrangement shown wherein the key is on the valve and the keyway in the coupling parts. Thus as clearly shown in Figs. 2, 3, 4 and 5 the valve is provided with a peripheral key 49 extending around the equator of the valve, i. e., in a diametrical plane perpendicular to the axis of rotation of the valve, this key being adapted to engage in a corresponding keyway 50 formed in the coupling parts 1 and 2. The said key is formed in two complementary parts 51 and 52, one on the valve segment 4 and the other on the valve segment 5, these key parts thus each being in the form of a semicircle or major segment of a circular ring and conveniently being integrally formed with their respective valve segments. The keyway 50 is also formed in two complementary parts respectively marked 53 and 54, one part being in the coupling part 1 and the other in the coupling part 2 as is clearly seen in Fig. 5.

It will be understood that the key 49 and keyway 50 are located in a plane at 45° to the meeting faces of the coupling parts 1 and 2 and the valve segments 4 and 5 and passing through the centre of the composite valve 3, and that, when this valve is in the position shown in Fig. 2, the whole of the key part 51 on the valve segment 4 will be entirely housed within part 53 of the keyway 50 and consequently wholly within the coupling part 1 and that, similarly, the part 52 of the key 49 on the valve segment 5 will be entirely located within the coupling part 2, so that the key and keyway do not interfere with the separation of the two coupling parts. However, once the valve 3 starts to rotate from the position shown in Fig. 2 towards the position shown in Fig. 3, the key part 51 on the valve segment 4 commences to enter the keyway 54 in the coupling part 2, whilst the key part 52 on the valve segment 5 commences to enter the part 53 of the keyway 50 which is in the coupling part 1. This inter-engagement of the key part of each of the two valve segments with the keyway parts of the coupling parts of the other and complementary valve segment exerts pressure in an axial direction upon the sealing ring 16 (and through the valve segments also on the sealing rings 44) and thus serves to draw the coupling parts together and ultimately to lock them in fluid tight face to face engagement as shown in Fig. 3 for example.

Figure 5:
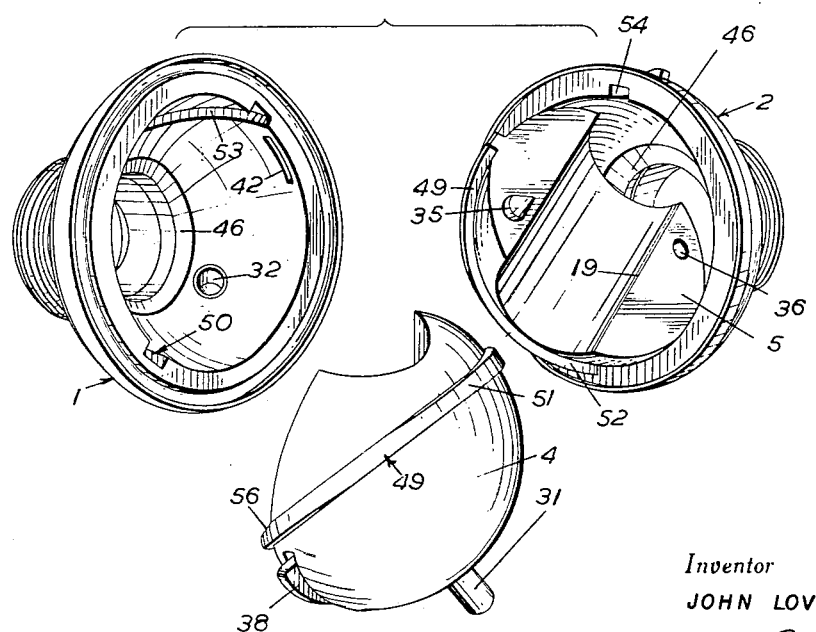
Fig. 5 is an exploded view, drawn in perspective, of the coupling shown in Fig. 1.

To facilitate the inter-engagement of the key parts 51 and 52 with the keyway parts 54 and 53, the leading ends of these keyway parts, may be flared as shown, for example, at 55, Fig. 2, and similarly the leading ends of the key parts 51 and 52 may have convergingly tapered ends 56 (Figure 5).

Assuming that after separation the two coupling parts 1 and 2, with their valve segments 4 and 5 respectively locked in the positions shown in Fig. 2 by catches 38 and 38', are to be re-connected to place the bores 10 and 11 of the coupling in communication, then the two coupling parts are brought face to face as shown in Fig. 2 so that the pins 34 and 35 of the valve segments 4 and 5 respectively enter the holes of 36 and 37 of the opposite valve segments, so as thus to inter-engage the two valve segments for unitary movement, the pins 34 and 35 simultaneously moving the locking catches 38 and 38' to their released positions so that on releasing the catch 26 the composite valve 3 may be rotated about its axis.

If the valve is now rotated the two parts 51 and 52 of the key 49 on the two valve segments 4 and 5 will move respectively into the parts of the keyway 50 that are located in the coupling parts of the complementary valve segments, thus securing the two coupling parts 1 and 2 against separation in the direction of the axes of the bores 10 and 11 by the action of the key parts 51 and 52 and also by the movement of the axes of the pins 34 and 35 of the valve segments out of parallelism with the axes of the bores 10 and 11 of the coupling parts 1 and 2. Thus the composite valve 3 itself draws the two coupling parts together and secures them in this position.

When the valve 3 has been rotated through 180° the passage 19 therethrough will have moved from the position shown in Fig. 2 (where its axis is at right angles to the axis of the bores 10 and 11 of the coupling parts 1 and 2), to a position in which it is coaxial with these bores 10 and 11 (as is shown in Fig. 3), the passage through the valve providing for a full or unrestricted flow of fluid from the one coupling part to the other. On completing the rotation of the valve 3 through the said 180°, the catch 26 will automatically click into the notch 29 and releasably lock the valve in this coupling part-connecting position.

If it is desired to disconnect the two pipes joined by the self-sealing coupling above described, then the catch 26 is again operated to free the valve 3 which is next rotated through 180° so as to bring its passage 19 from the position shown in Fig. 3 to the position shown in Fig. 2, when the front ends of the bores 10 and 11 of the coupling parts 1 and 2 will be fluid-tightly sealed by the imperforate adjoining portions of the valve segments 4 and 5. On the spherical valve 3 completing its rotation of 180° the catch 26 will automatically operate and its nose 27 will click into the cooperating notch 28, thereby indicating that the valve has made its full movement and arresting the valve in this position. When the valve has reached this position the two coupling parts, together with their respective segments, can be drawn apart, and the only loss of fluid that will be sustained is the loss of that fluid trapped in the passage 19 of the valve 3. It will be readily understood that the valve segments 4 and 5 are normally retained in their respective coupling parts by the key 50 and the catches 38 or 38', but that by releasing these catches the segments may be removed from their coupling parts, e. g., for inspection or replacement, as shown in Fig. 5 of the drawings.

In the modification illustrated in Fig. 7, the two coupling parts 1 and 2 are made identical with one another as are the two valve segments 4 and 5 but each of these valve segments is provided with an operating spindle 20'. Thus the two coupling parts and their segments are interchangeable and the production and servicing of the complete coupling is simplified. In all other respects the coupling may be as that already described with reference to Figs. 1 to 6 of the drawings.

Figure 8 illustrates a modification of the coupling shown in Figs. 1 to 6, the only difference being in the method of effecting the sealing together of the two coupling parts. In this case the two coupling parts are adapted to telescope together at their front or meeting ends, one coupling part, e. g. the part 1 having an internally cylindrical forward extension 1' adapted to fit over an externally cylindrical portion 2' of the coupling part 2, and one or more sealing rings 57 being located between the said two telescoped portions of the coupling parts. Thus in the example illustrated one resilient O-ring is located between the two telescoping portions 1' and 2' of the coupling parts and is axially positioned in an internal annular groove 58 in the outer of such two telescoping portions of the coupling parts.

In the embodiment of the invention illustrated in Fig. 9, the construction is very similar to that shown in Figs. 1 to 6 but the connection of the two coupling parts 1 and 2 together is effected wholly by, or is assisted by, a union nut 59. This union nut is of cylindrical form and is arranged around the two coupling parts, being screwed on to the coupling part 2 and having an inwardly directed flange 60 adapted to engage behind a peripheral outwardly directed flange 61 on the coupling part 1 so that, when the union nut 59 is screwed on to the coupling part 2, the latter will be drawn towards the coupling part 1 to compress a sealing ring 16' located between the two coupling parts 1 and 2 and thereby peripherally to seal the spherical chamber in which the valve 3 is housed.

As has been mentioned, the union nut 59 may serve as the sole means of securing the two coupling parts together or it can be combined with the equatorial key and keyway arrangement previously described.

As previously pointed out, the construction of a self-sealing coupling as shown in Figs. 1 to 6, and indeed as shown in Figs. 7, 8 and 9 and some subsequent figures of the drawings, results in the loss of a small quantity of fluid each time the two coupling parts 1 and 2 are disconnected and the trapping in the passage 19 of a small volume of air when the coupling is remade. Figs. 10–12 however, illustrate a modification of the coupling shown in Figs. 1 to 6 whereby this loss of fluid and trapping of air is avoided. However, the coupling shown in Figs. 10 to 12 is, with the exceptions which will now be mentioned, substantially the same as that shown in Figs. 1 to 6.

Thus in this case the passage 19' through the composite valve 3 is formed entirely in one of the valve segments instead of partially in one and partially in the other, the passage 19' being formed in the example illustrated, entirely in the valve segment 5 with its axis lying in the plane of the front face of this valve segment and the latter having a diametrical semi-cylindrical bulge or protuberance 65 containing one half of the passage and which is received into a correspondingly shaped recess 65' provided in the front or meeting face of the valve segment 4.

In order that the ends of the passage 19' shall be fluid-tightly sealed when the valve 3 is in its coupling part-sealing position (shown in Fig. 11), the coupling part 2 (containing the segment 5) is furnished both at the top and the bottom with a forwardly projecting extension or lug-like projection, these projections being marked 66 and 67 in the drawings and being respectively provided internally with detachable seating elements 68 and 69 having part spherical internal surfaces 70 and 71 matching, and respectively for engagement with, the external surface of the valve 3, the said seating elements thereby sealing the ends of the passage 19' in the valve when the latter is rotated to the coupling part-sealing position shown in Figs. 11 and 14.

As will be seen from Fig. 10 in particular, at the upper and lower parts thereof, the coupling part 1 is cut away to receive the lug-like projections 66 and 67 on the coupling part 1, and appropriate sealing means are arranged between the meeting faces of the two coupling parts.

In the modification shown in Fig. 13 of the drawings, the coupling only differs from that described in Figs. 1 to 6 in that the valve spindle 20, and consequently the axis of rotation of the valve 3, is at right angles to the bores 10 and 11 of the coupling parts 1 and 2 instead of being oblique thereto, whilst the meeting faces of the two valve segments 4 and 5 are oblique to the axes of said bores 10 and 11 instead of being at right angles thereto. Moreover, the single key 49 and keyway 50 is replaced by two parallel keys 49' and cooperating keyways, these keys and keyways being of annular form and located in planes at right angles to the axis of rotation of the valves and on either side of the center of the latter.

Fig. 14 shows a further modification of the coupling shown in Figs. 1 to 6. In this case the passage of the valve is formed complementarily in the two valve segments 4 and 5 as before, but instead of passing through the centre of the valve, it is in the form of an annular groove 19" around the exterior of the valve, its centre line at the spherical surface of the valve 3, lying in a plane coincident with the plane containing the meeting faces of the valve segments 4 and 5. In all other respects, except that in the example illustrated the sealing between the two coupling parts 1 and 2 is a combination of that shown in Figs. 1 to 6 and that shown in Fig. 8, the valve is the same as that already described.

Fig. 15 shows a still further modification of the coupling illustrated in Figs. 1 to 6, this modified coupling being very similar to that shown in Fig. 14 but having the groove 19" of that construction divided into two separate annular grooves 19''', one provided respectively in each of the two valve segments 4 and 5 adjacent the plane front or meeting surfaces of these segments and with their centre lines in planes parallel to one another and to the planes of the front or meeting faces of the two valve segments 4 and 5 and of the two coupling parts 1 and 2. Thus with this construction no loss of fluid is entailed when the coupling is disconnected.

Although the bores 10 and 11 of the two coupling parts 1 and 2 are, in all the constructions illustrated in the drawings, shown as being in co-axial alignment, it should, nevertheless, be understood that the said bores need not necessarily be coaxial but could have their axes inclined to one another but meeting, if extended, at the centre of the spherical valve 3. Moreover the passage 19 through the valve 3 need not necessarily be rectilinear. However, whether the passage through the valve is rectilinear or curvilinear or made up of two or more rectilinear and/or curvilinear portions, its end portions at least should preferably have their axes lying on diameters of the valve 3 and coaxial with the axes of the said bores when the valve is in the bore connecting position. This is not, of course the case where the valve passage is arranged around the outside of the valve as shown, for example, in Figs. 14 and 15 of the drawings.

I claim:

1. A self-sealing pipe coupling comprising: two tubular coupling parts each having a bore terminating in a part-spherical recess and together defining a hollow spherical valve chamber; a composite spherical valve, having a passage extending diametrically therethrough, rotatable in said valve chamber and comprising two separable complementary part-spherical valve segments; means for rotating said composite valve between a valve-open position, in which said passage registers with said coupling-part bores, and a valve-closed position in which each such bore is sealed by one of said valve segments, the axis of rotation of said valve lying in a plane bisecting the angle between the valve-open and valve-closed positions of the axis of said valve passage; co-operating means on said valve segments preventing relative movement between such segments in directions parallel with their junction; means on said valve segments and said coupling parts for interlocking the latter together when the valve is in its said valve-open position; and means for sealing the junction between said coupling parts.

2. A self-sealing coupling according to claim 1, wherein the junction between said two coupling parts, and the junction between said two valve segments, when the latter are in the said valve-closed position, lie in a plane bisecting the angle between the plane containing the equator of the valve and the axis of rotation of the valve.

3. A self-sealing coupling according to claim 2, wherein the said passage is complementarily formed partially in each of the said valve segments.

4. A self-sealing coupling according to claim 3, including means for releasably retaining the said valve segments against rotation in their respective coupling parts when the valve segments have been moved to their said valve-closed positions and the said coupling parts and valve segments have been separated.

5. A self-sealing coupling according to claim 4, including means for releasing the said valve segments for rotation in their respective coupling parts upon the latter being brought together.

6. A self-sealing coupling according to claim 5, wherein said means for retaining the said valve segments against rotation in their separated coupling parts comprise at least one spring-urged catch for each valve segment, a catch-releasing element on each segment serving to release the catch of the complementary valve segment when the two segments are brought together.

7. A self-sealing coupling according to claim 6, including a projection on the junction surface of each valve segment and a complementary recess in the junction surface of the other valve segment to receive said projection and to locate the segments with respect to each other.

8. A self-sealing coupling according to claim 7, in which said projections each comprise a pin located eccentrically on a diameter of, and projecting perpendicularly from, the junction surface of the valve segment.

9. A self-sealing coupling according to claim 8, including inclined surfaces on the said pins which, upon introduction into said recesses engage and displace the said catches to release the valve segments for rotation in said coupling parts.

10. A self-sealing coupling according to claim 1, wherein the said means for interlocking the said two coupling parts together comprise a peripheral key extending around the equator of the said spherical valve, a keyway in the spherical surface of said valve chamber, said key being engaged in said keyway, the said key being formed complementarily partially on each of the said part-spherical valve segments and the said keyway being formed complementarily partially in each of said coupling parts, whereby, when the said spherical valve is rotated about its axis to move the said valve segments from their valve-closed positions towards their valve-open positions the parts of the key of the valve that are provided on the two complementary valve segments respectively each enter the part of the keyway of the coupling part of the other valve segment, thereby drawing and holding the two coupling parts together.

11. A self-sealing coupling according to claim 10, wherein the complementary parts of the said keyway have flared leading ends to facilitate the key of each valve segment entering the keyway of the coupling part of the other valve segment as the segments are rotated from their valve-closed positions.

12. A self-sealing coupling according to claim 1, in which said means for rotating the composite valve comprise a radial spindle on at least one of said complementary valve segments, such spindle being journalled in a coupling part and extending to the exterior thereof; an operating lever on said spindle and catch means for releasably securing the operating lever in either of two alternative positions, one in which the said valve segments are in their valve-closed positions and the other in which the valve segments are in their valve-open positions.

13. A self-sealing pipe coupling comprising: two tubular coupling parts each having a bore terminating in a part-spherical recess and together defining a hollow spherical valve chamber; a composite spherical valve, having a passage therein, rotatable in said valve chamber and comprising two separable complementary part-spherical valve segments; a radial spindle on one of said valve segments for rotating said composite valve between a valve-open position, in which said passage registers with said coupling-part bores, and a valve-closed position in which each such bore is sealed by one of said valve segments, said spindle being journalled in one of said coupling parts and extending to the exterior thereof, the axis of said spindle lying in a plane, oblique to the junction between said valve segments, constituting one of three orthogonal planes, the centre line of said passage lying in the second of such planes when the valve is in said valve-open position and in the third of such planes when the valve is in said valve-closed position; co-operating means on said coupling parts and valve segments for retaining a valve segment in each coupling part recess when the valve is in said valve-closed position; and means for securing said coupling parts together when said valve is in said valve-open position.

14. A self-sealing coupling according to claim 13, wherein the said passage comprises at least one groove in the periphery of said composite valve adjacent to the junction between the segments thereof, the centre line of said groove lying in a plane parallel to the said junction.

15. A self-sealing coupling according to claim 14, wherein the said passage comprises two separate grooves in the periphery of said composite valve, one on either side of the junction between the said valve segments.

16. A self-sealing coupling according to claim 1, wherein the said passage lies wholly within one of the said complementary valve segments, the coupling part housing such segment sealing the ends of the passage when the valve is in said valve-closed position.

References Cited in the file of this patent

UNITED STATES PATENTS

| | | |
|---|---|---|
| 214,335 | Westinghouse | Apr. 15, 1879 |
| 2,373,925 | Townhill | Apr. 17, 1945 |
| 2,440,946 | Hansen | May 4, 1948 |
| 2,458,899 | Doubrava | Jan. 11, 1949 |

FOREIGN PATENTS

| | | |
|---|---|---|
| 874,879 | France | May 26, 1942 |
| 876,521 | France | Aug. 3, 1942 |